United States Patent [19]

Sorlien

[11] 4,191,991

[45] Mar. 4, 1980

[54] LIGHT SHIELD FOR MAST-MOUNTED NAVIGATION LIGHTS

[76] Inventor: Charles J. Sorlien, 7005 W. 23rd St., St. Louis Park, Minn. 55426

[21] Appl. No.: 842,726

[22] Filed: Oct. 17, 1977

[51] Int. Cl.² .......................................... F21Y 17/02
[52] U.S. Cl. ................................ 362/319; 362/66; 362/280; 362/303; 362/359; 362/431
[58] Field of Search ....................... 362/61, 66, 67, 71, 362/280, 290, 303, 418, 431, 359

[56] References Cited

U.S. PATENT DOCUMENTS

| | | | |
|---|---|---|---|
| 1,843,454 | 2/1932 | Manson | 362/418 X |
| 2,300,067 | 10/1942 | Schwab | 362/61 X |
| 2,528,570 | 11/1950 | Garlow | 362/431 X |
| 2,850,621 | 9/1958 | Bateman et al. | 362/359 X |
| 3,061,259 | 10/1962 | Troccoli | 362/418 X |
| 3,070,690 | 12/1962 | Horn | 362/436 |
| 3,192,376 | 6/1965 | Najimian, Jr. | 362/61 |
| 3,221,162 | 11/1965 | Helman et al. | 362/280 X |
| 3,253,136 | 5/1966 | Paul | 362/431 X |
| 3,833,800 | 9/1974 | Stewart et al. | 362/61 |
| 4,115,845 | 9/1978 | Blahut | 362/431 X |

FOREIGN PATENT DOCUMENTS 642427  10/1927  France ........................ 362/440

*Primary Examiner*—Peter A. Nelson
*Attorney, Agent, or Firm*—Peterson, Palmatier, Sturm & Sjoquist, Ltd.

[57] ABSTRACT

The shield for navigation lights includes a generally horizontal shade panel and downwardly extending side panels. The side panels are adjustably clamped to the mast of the navigation light so that the shade panel casts a controlled shadow over the boat and its occupants without violating mandated visibility criteria.

9 Claims, 7 Drawing Figures

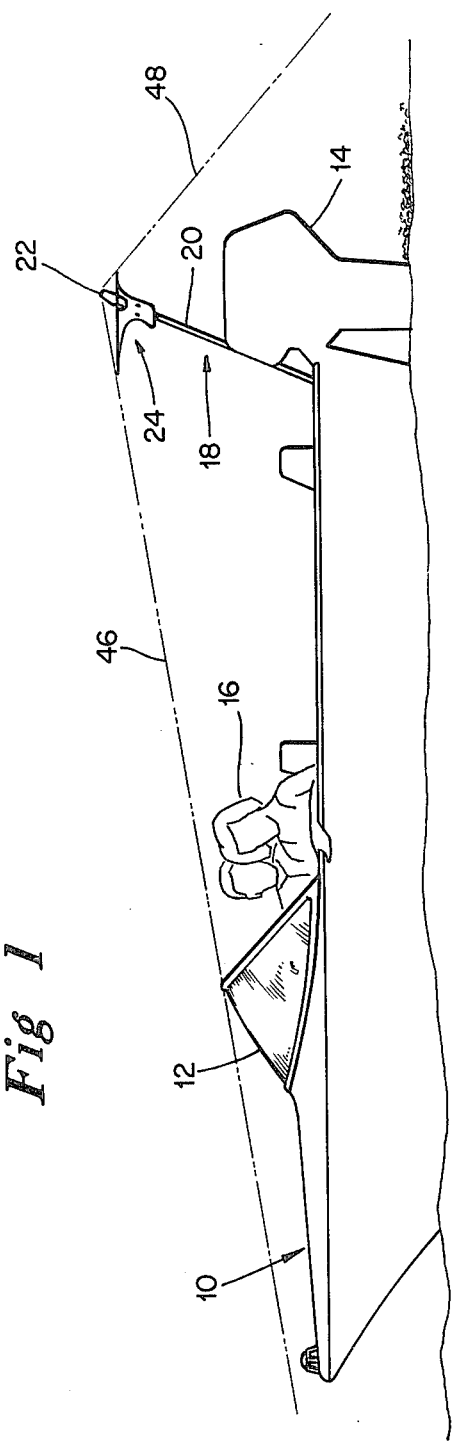
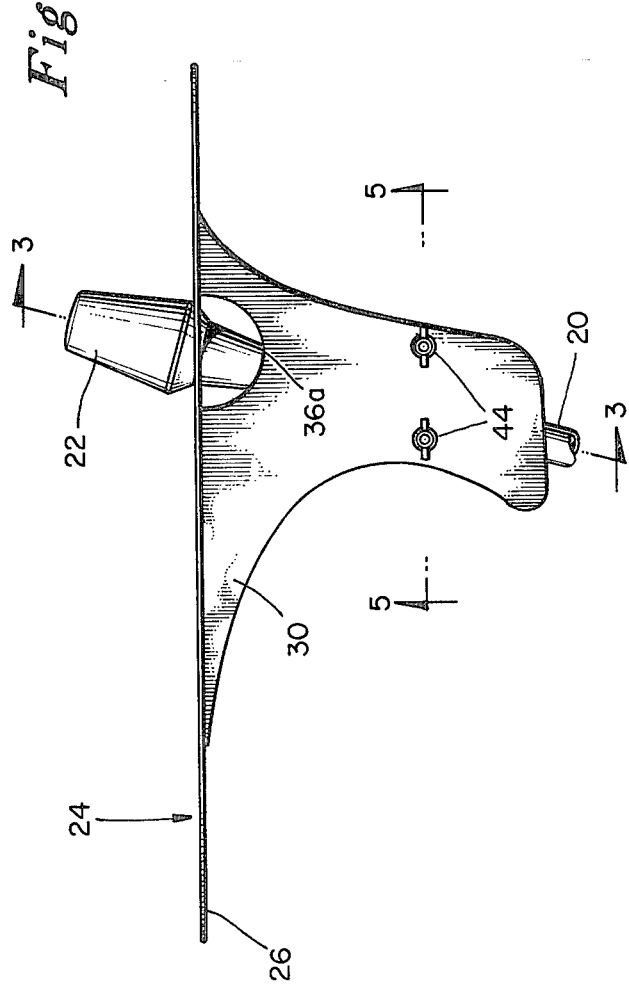

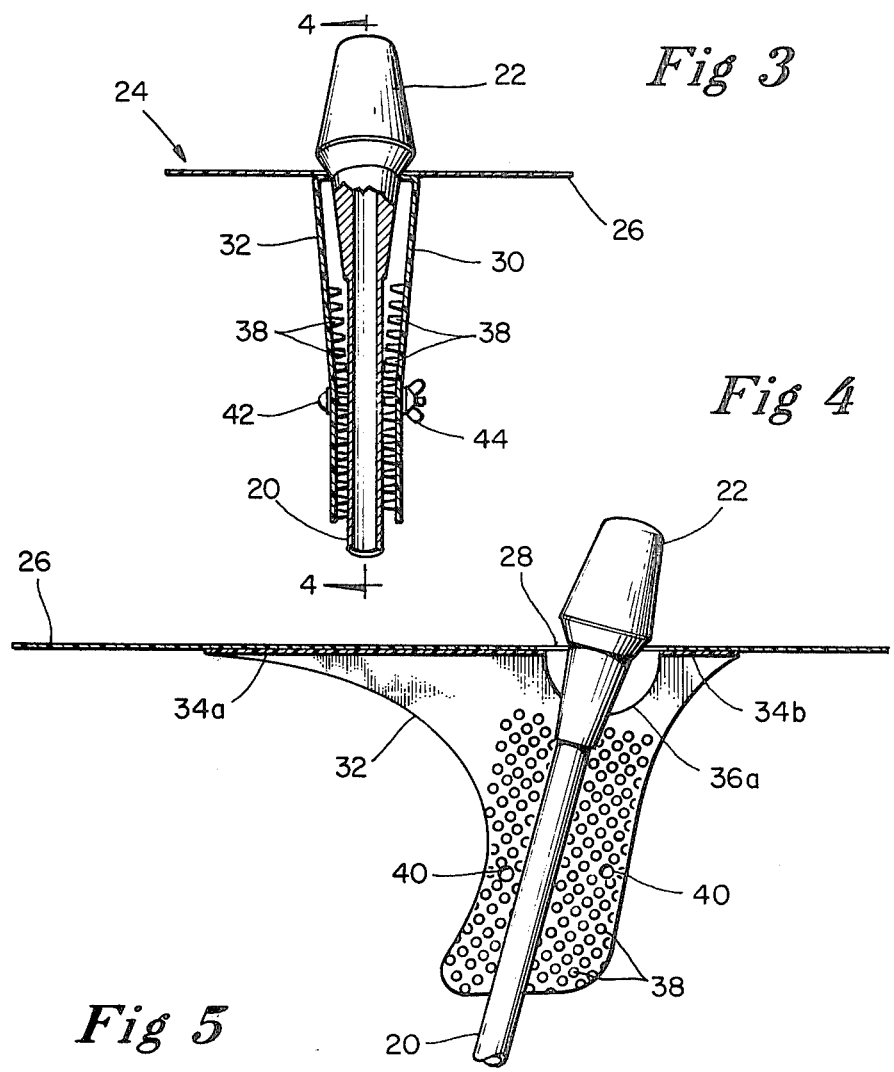
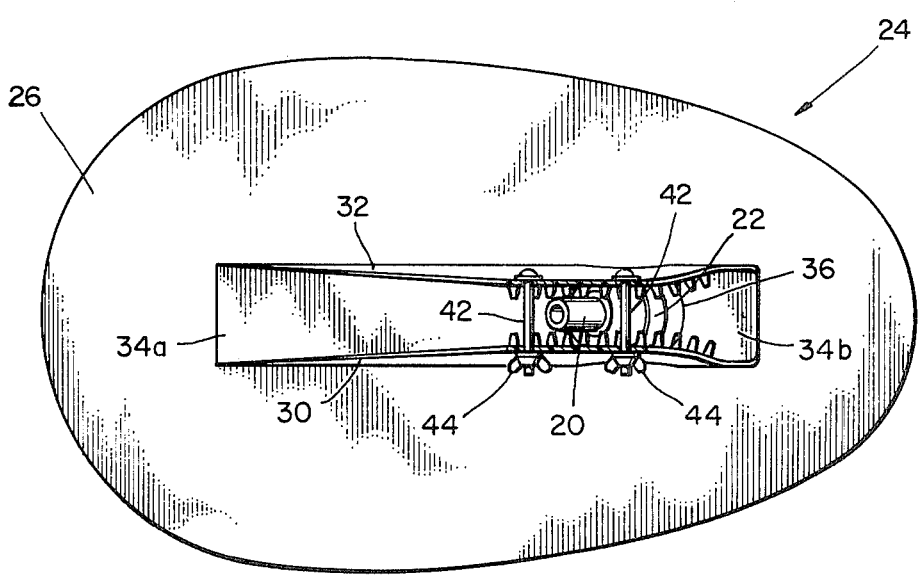

LIGHT SHIELD FOR MAST-MOUNTED NAVIGATION LIGHTS

BACKGROUND OF THE INVENTION

1. Field of the Invention

This invention relates generally to navigation lights of the type employing a mast with a lens at the top, and pertains more particularly to a shield for preventing objectionable light rays from striking the occupants directly or from reflective parts of the boat.

2. Description of the Prior Art

United States Coast Guard regulations specify that all motorized watercraft must display the correct lights for their particular class from sunset to sunrise when underway or at anchor. The Inland Rules specifically require that Classes A (under 16 feet in length), 1 (16 feet to less than 26 feet), 2 (26 feet to less than 40 feet) and 3 (40 feet to 65 feet) must display a 32-point (360°) bright white light at the rear of the craft to show all around the horizon and be visible at a distance of at least two miles, it being further stipulated that the light must be higher than the red-green combination light located at the bow of the boat. To be visible around the horizon the stern light is required to be mounted higher than any portion of the craft.

When such a light is displayed in accordance with the Inland Rules, the white aft light, commonly referred to as a stern light, shines down on the occupants of the boat, severely impairing visibility on the water at night. The white light also shines in the eyes of the boat operator when looking to the rear of the boat, appreciably obstructing the view that he receives of anything behind his craft. Furthermore, on a number of watercraft the stern light shines directly onto the dashboard causing a reflection of the dashboard in the windshield, thereby interfering with his clear vision ahead which is necessary in order to navigate the boat in a safe manner.

As far as known to me, only make-shift arrangements have been employed in an effort to combat the discomfort and impaired visibility resulting from the elevated navigation lights of the type alluded to above. Such efforts have included the seating of passengers so as to block the light. The operator frequently has resorted to some sort of visor worn on his head. At times, the operator simply shields his eyes from the navigation light with one hand. Obviously, these are not satisfactory solutions and the basic problem remains unsolved.

SUMMARY OF THE INVENTION

Accordingly, one important object of my invention is to increase the safety as far as nighttime operation of watercraft is concerned. In this regard, an aim of the invention is to prevent light from a raised 32-point navigation light from shining down on the occupants of a boat which light would otherwise impair the nighttime visibility of those, particularly the operator, in the boat. More specifically, my invention eliminates objectionable reflections that can be disconcerting to the operator and which can interfere with his clear vision when looking ahead. Also, my invention provides a much clearer view when looking rearwardly, for the operator does not look directly into the stern light, the brightness of which obscures clear vision as far as objects behind the boat are concerned.

Another object of my invention is to provide a shield that will accomplish the foregoing without violating any rule or regulation now in effect.

Another object is to provide a shield that can be used on various types, sizes and styles of masted navigation lights, a shield constructed in accordance with the teachings of my invention being readily mounted or attached to the various kinds of lights now on the market.

A further object of the invention is to provide a shield that is readily adjustable into an optimum position for the particular boat with which it is currently being used. In this regard, the shield can be tilted at various angles depending upon the size of the boat, the location of reflective surfaces, seating arrangements and even the size of the occupants.

Yet another object of the invention is to provide a shield of the foregoing character that effectively resists wind action.

Another object is to provide a shield that can be easily removed for storage during the day. Inasmuch as some navigation lights, particularly stern lights, are detachable at their lower end or base, the shield envisaged by me can be slipped off at either the bottom or the top of the masted navigation light.

Yet another object is to provide a light shield that can be readily flattened when removed, thereby facilitating initial shipment and subsequent storage of the shield when not in use. Owing to the ease with which the shield can be removed from the navigation light, it is contemplated that it will usually be stored during the daytime when not needed. Being able to flatten the shield enables the owner to tuck it in any number of convenient places aboard the craft which would not be possible if it were not collapsible.

Still another object is to provide a shield for navigation lights that is quite lightweight, and low in cost, thereby encouraging its widespread use.

Yet another object is to provide a light shield for stern lights and the like which is aesthetically attractive, this being another factor influencing the purchasing of the item and even entering into a decision to leave the shield mounted on the navigation light even during the daytime.

The invention has for still a further object the provision of a light shield that will not mar or scratch the finish of the mast on which the navigation light is carried.

Briefly, my invention constitutes a shade panel having downwardly directed side panels that are spaced laterally with respect to each other so as to accommodate therebetween the mast of a navigation light. The shade panel has a hole therein of sufficient size so that masts of different cross sections can be accommodated and also of sufficient size so that the shade panel can be tilted into various angles in order that the position most effective for the particular circumstances at hand can be realized. When optimumly adjusted, it is planned that only two wing nuts need be tightened to maintain the shield in a clamped, yet readily detachable, condition.

BRIEF DESCRIPTION OF THE DRAWINGS

FIG. 1 is a side elevational view of a boat utilizing my light shield;

FIG. 2 is an enlarged side elevational view of my light shield, only the upper portion of the mast shown in FIG. 1 appearing in this view;

FIG. 3 is a sectional view taken in the direction of line 3—3 of FIG. 2;

FIG. 4 is a sectional view taken in the direction of line 4—4 of FIG. 3;

FIG. 5 is a sectional view taken in the direction of line 5—5 of FIG. 2;

DESCRIPTION OF THE PREFERRED EMBODIMENT

Figure 7:
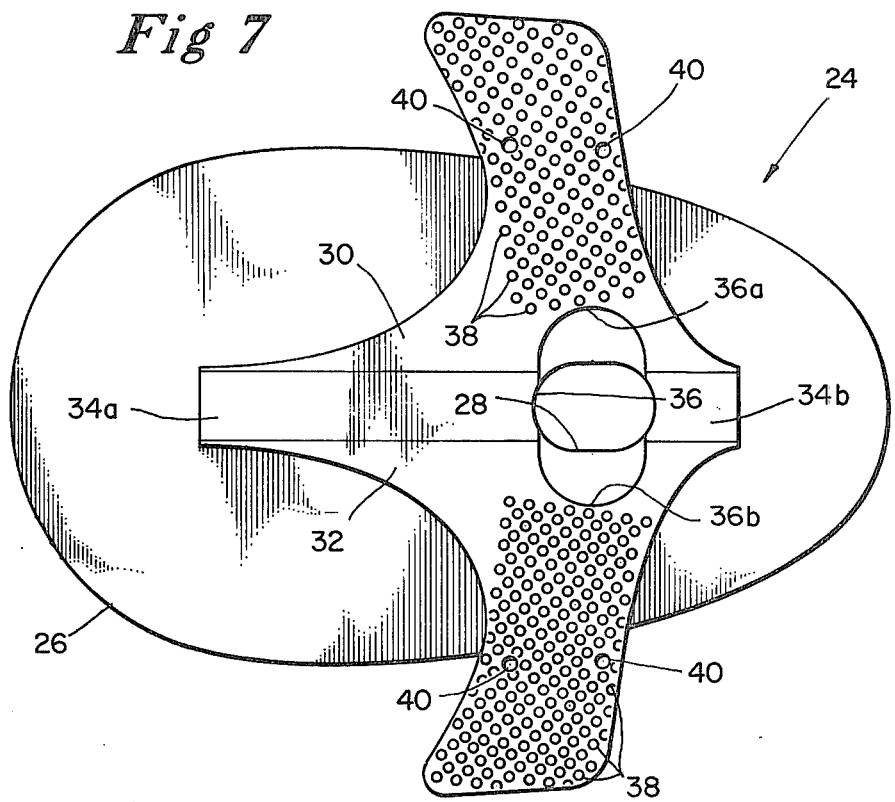
FIG. 7 is a bottom view of the flattened shield shown in FIG. 6.

Referring first to FIG. 1, a typical boat 10 has been illustrated, having a windshield 12 and an outboard motor 14 at its stern. Two occupants 16 are also shown, one being the operator and the other a passenger.

At the rear of the boat 10, actually to one side of the motor 14, is a stern light assembly 18 which includes a tubular mast 20 having a light at the top encased in a lens 22.

Figure 6:
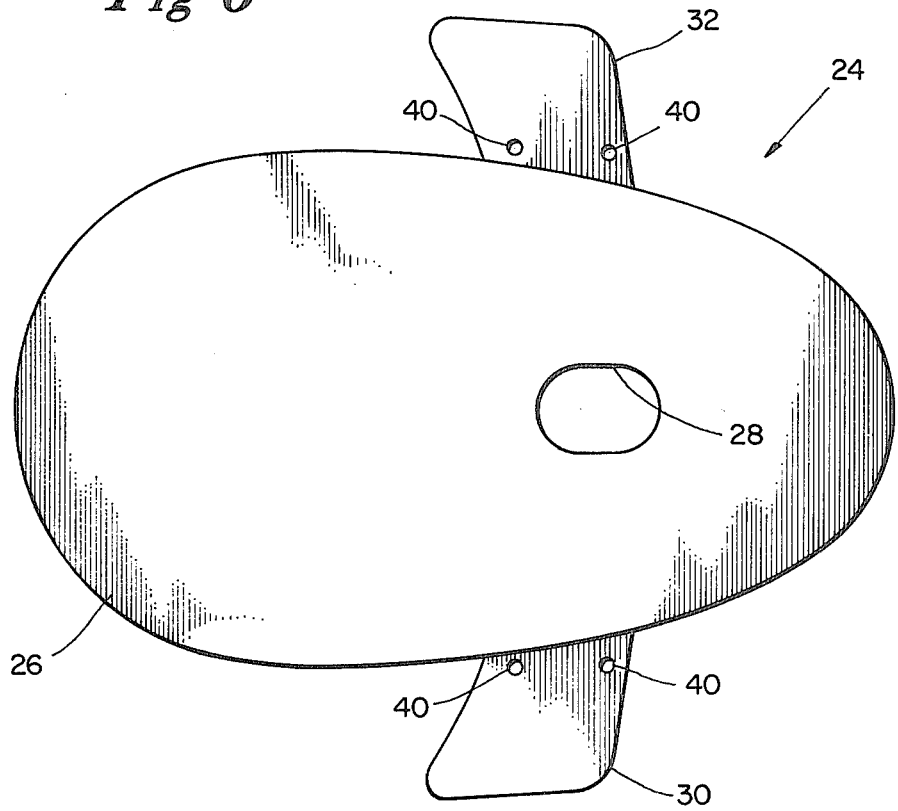
FIG. 6 is a top plan view of the shield when flattened for shipment or storage.

A shield exemplifying my invention has been denoted generally by the reference numeral 24. The shield 24 includes a generally horizontal shade panel 26. From FIGS. 5—7 it will be discerned that the shade panel 26 is elongated and rounded at its opposite ends. Stated somewhat differently, the panel 26 has a generally oval configuration or shape. As best understood from FIG. 6, the shade panel 26 has a hole 28 nearer one end than the other. For a purpose hereinafter made manifest, the hole 28 is elongated in a fore and aft direction.

The shield 24 further comprises a pair of generally vertical side panels 30 and 32, the panels being laterally spaced in order to accommodate the mast 20 therebetween. Actually, the upper edges of the side panels 30, 32 are integrally joined to fore and aft central strips 34a and 34b. From FIG. 7, it can be learned that the strip 34a is considerably longer than the strip 34b.

In this regard, the side panels 30, 32 curve upwardly toward the opposite ends of the shade panel 26 so that the forward edge of each panel 30, 32 extends farther from the hole 28 than does its rear edge. Since the shade panel 26 extends farther forwardly than rearwardly from the hole 28, it follows that the panel 26 is made quite wind resistant. In other words, the forwardly disposed portions of the side panels 30, 32 effectively reinforce the shade panel 26. In practice, the side panels 30, 32 and the strips 34a and 34b are cut from a single sheet of material. The central strips 34a, 34b are secured to the underside of the shade panel 26. In actual practice, it is planned that the shade panel 26, as well as the side panels 30, 32 and the central strips 34a, 34b be made of plastic, such as polyethylene. When this material is employed, the central strips 34a, 34b can be readily fastened or secured to the panel 26 by heat sealing, sonic welding or by means of a suitable adhesive. However, mechanical fastening means, such as rivets, can be used in fastening the central strips 34a, 34b to the underside of the panel 26.

Stated somewhat differently, the upper edges of the side panels 30, 32 are hingedly connected to the underside of the shade panel 26 through the agency of the central strips 34a, 34b. If it were not for the presence of an oval hole 36, as best seen in FIG. 7, the strips 34a, 34b would constitute a single uninterrupted strip. However, the oval hole 36 is necessary, particularly the central portion thereof, for the accommodation of the mast 20 in the same manner or fashion as the hole 28 accommodates the mast. However, the oval configuration is imparted to the hole 36 to provide downwardly curved edges 36a, 36b for the accommodation therebetween of variously configured lenses 22. Frequently, a lens, as is evident from the lens 22 depicted in FIG. 4, has a bulging midsection and the downwardly curved edges 36a, 36b permit the side panels 30, 32 to assume a vertical and parallel relationship with each other which could not conveniently be obtained otherwise.

Each of the side panels 30, 32 has a multiplicity of protuberances 38 projecting therefrom. Actually, especially when the side panels 30, 32 are of plastic material, the panels 30, 32 can have the protuberance 38 molded integrally thereon.

In addition to the protuberances 38, the panels 30, 32 each have a pair of holes 40 which accommodate bolts 42 with wing nuts 44 thereon. In this way, when the side panels 30, 32 assume the generally parallel vertical relationship appearing in FIG. 3, the tightening of the wing nuts 44 will clamp the side panels 30, 32 against the mast 20, more specifically causing certain of the protuberances 38 to be forced tightly against the mast 20.

Although not portrayed in FIG. 3, the various protuberances 38 that bear against the sides of the mast 20 are, owing to their resiliency, flexed from the perpendicular condition pictured. Such flexing enables the shield 24 to be securely yet releasably clamped to the mast 20. Also, the yieldability of the protuberances 38 permits various cross sections of masts to be accommodated. In this regard, although a tubular mast 20 has been illustrated, some masts have a square or rectangular cross section. Still further, the flexibility of the side panels 30, 32 themselves can assume other than a truly parallel relationship to receive therebetween masts 20 of different sizes and cross sections.

It will perhaps help to apply broken or dashed lines 46, 68 to FIG. 1. What these lines 46, 48 represent is the shadow cast by the shade panel 26 when the side panels 30, 32 are properly clamped to the mast 20 by means of the bolts 42 and wing nuts 44. From FIG. 4 in particular it should be obvious that with the wing nuts 44 loosened, the shield 24 can be tilted or rocked with respect to the mast 20 and the lens 22 so as to shift the lines 46, 48 upwardly or downwardly, The line 46 actually denotes a direction of the light rays emanating from the lens 22 that can only pass above the windshield 12 and thus there can be no reflection at all from or in the windshield. As already pointed out, in the past, light from elevated stern lights has struck the dashboard (not shown) causing reflection upwardly onto the underside of the windshield 12 and then into the eyes of the operator. Also, as hereinbefore explained, when the operator looks rearwardly, he has looked at the bright light coming from the lens 22 and his rearward vision is thus impaired because he cannot readily see other boats that may be behind him. Sometimes, particularly when maneuvering in a marina or dockage, or when trolling for fish, the operator of a boat will run his boat in reverse and this poses a special problem when the operator is compelled to look in the direction of an open light, such as that coming from the lens 22 when not utilizing my shield 24. Of course, there are other times when the boat must be backed up. However, even when moving forwardly the operator must be constantly vigilant and know what boats might be traveling back of him.

The facile manner in which my shield 24 can be attached to the stern light assembly 18 should be obvious. All that the user need do is to move the shield 24 downwardly so that the hole 28 in the shade panel 26, and also the central portion of the hole 36, will pass over the lens 22. He then tilts the shade panel 26 into the best angle, generally horizontal, that best suits the conditions at hand. It will be appreciated that the shield 24 can also be adjusted vertically to position the shade panel 26 properly subjacent the lens 22.

Thus, the operator is interested in obtaining a shaded cone beneath the lines 46, 48. The ability to rock or tilt, as well as raise or lower, the shade panel 26 enables him to obtain the best possible shading effect which will avoid any direct impingement of light on the occupants or cause objectionable reflection from any part of the boat.

The shield 24 can be removed just as easily as it is attached. All that the user need do is to remove the wing nuts 44, spread the side panels 30 and 32, and the shield 24 can be slipped up over the lens 22.

It should be recognized that sometimes the mast 20 is readily detachable at its base. If the user prefers, the shield 24 can be lowered and taken off the lower end of the mast 20 after the mast has been detached.

Whereas the versatility of my shield 24 should be readily apparent from the foregoing description thereof, it should be mentioned that while the shield 24 has been illustrated in conunction with a stern light assembly 18, it will also find utility when the navigation light is mounted on top of the cabin of a boat. In such a case, the white light rays can be prevented from flooding the deck of the boat to the rear of the cabin. Also, the user of my shield 24 has the choice of orienting the shade panel 26 in a reverse fore and aft direction than from that shown in the drawings. In this regard, he can have the longer portion of the shade 26 facing rearwardly if he finds that more of the rear deck requires shading.

Consequently, my invention will find usefulness wherever a 32-point navigation light is mounted atop of a mast. It should be appreciated that the shield 24 does not adversely affect the basic purpose of the navigation light, for the light from the lens 22 can still be seen in all directions and still at the same distance that it would be seen if my shield 24 were not being used. Therefore, my invention promotes the safety and comfort of those operating a boat during the night without violating any of the currently in effect rules that have been promulgated and which must be adhered to.

I claim:

1. A shield for mast-mounted navigation lights comprising a shade panel having a hole therein for accommodating the upper portion of the mast supporting the navigation light at the top thereof, a pair of side panels having edges thereof secured to the underside of said shade panel and said side panels extending downwardly from said shade panel in the vicinity of said hole, and means for clamping said side panels against opposite sides of said mast so as to adjustably position said shade panel in a preferred position in relation to the navigation light atop said mast.

2. A shield in accordance with claim 1 in which said shade panel is elongated and said hole is nearer one end thereof than the other.

3. A shield in accordance with claim 2 in which the upper edges of said side panels extend away from said hole and toward opposite ends of said shade panels.

4. A shield in accordance with claim 3 including first and second strips extending from adjacent said hole toward said opposite ends of said shade panel, said strips being secured to the underside of said shade panels and the upper edges of said side panels being integral with said strips in order to secure said upper edges to the underside of said shade panel.

5. A shield in accordance with claim 4 in which the upper edges of said side panels curve downwardly at either side of said hole.

6. A shield in accordance with claim 4 in which said first strip is longer than said second strip and is located between said hole and the end of said shade farther from said hole.

7. A shield in accordance with claim 1 including resilient means on said side panels for bearing against said mast.

8. A shield in accordance with claim 7 in which said resilient means includes a plurality of flexible protuberances.

9. A shield in accordance with claim 1 in which each of said side panels has a pair of holes formed therein, and a pair of bolts extending through said holes, and wing nuts on said bolts so that the tightening of said wing nuts causes said side panels to be adjustably clamped to said mast.

* * * * *